United States Patent [19]
Rossel

[11] 3,911,905
[45] Oct. 14, 1975

[54] INSTALLATION FOR MONITORING SEVERAL PERSONS OR OBJECTS

[75] Inventor: Claude Rossel, Bellmund, Switzerland

[73] Assignee: Biviator S.A., Grenchen, Switzerland

[22] Filed: Mar. 20, 1974

[21] Appl. No.: 453,068

Related U.S. Application Data

[63] Continuation of Ser. No. 229,710, Feb. 28, 1972, abandoned.

[52] U.S. Cl.............................. 128/2.06 R; 128/419 P
[51] Int. Cl.² ........................................... A61B 5/04
[58] Field of Search ........... 340/147, 150, 222, 223, 340/309.1, 309.5, 413–415, 417–419; 128/2.05 R, 2.06 A, 2.06 B, 2.06 R, 2.1 A, 2.1 R, 419 P

[56] References Cited
UNITED STATES PATENTS

| | | | |
|---|---|---|---|
| 2,757,361 | 7/1956 | Cameron | 340/222 |
| 3,217,306 | 11/1965 | Hillman | 340/413 |
| 3,236,239 | 2/1966 | Berkovits | 128/419 P |
| 3,264,613 | 8/1966 | Stolle | 340/415 |
| 3,326,043 | 6/1967 | Roeske et al. | 340/413 |
| 3,513,833 | 5/1970 | Finch et al. | 128/2.06 R |
| 3,646,606 | 2/1972 | Buxton | 128/2.06 R |

OTHER PUBLICATIONS

Blumenfeld et al., "Medical & Biological Engineering," Vol. 9, No. 6, Nov. 1971, pp. 637–643.
Jell, "Medical & Biological Engineering," Vol. 8, No. 4, July, 1970, pp. 383–388.

*Primary Examiner*—William E. Kamm
*Attorney, Agent, or Firm*—Imirie, Smiley & Linn

[57] ABSTRACT

An installation for sequentially monitoring a plurality of objects or persons such as heart patients includes connections to a heartbeat signal generator on each patient, a stepping and switching circuit acting to connect each such connection in sequence to a signal evaluator or monitor for a period sufficient for the monitor to measure the rate and for intensity of each input signal, means enabling the monitor to stop the switching circuit on any connection affording a signal which indicates an unusual or dangerous heart condition, and means for giving an alarm under such a condition.

7 Claims, 1 Drawing Figure

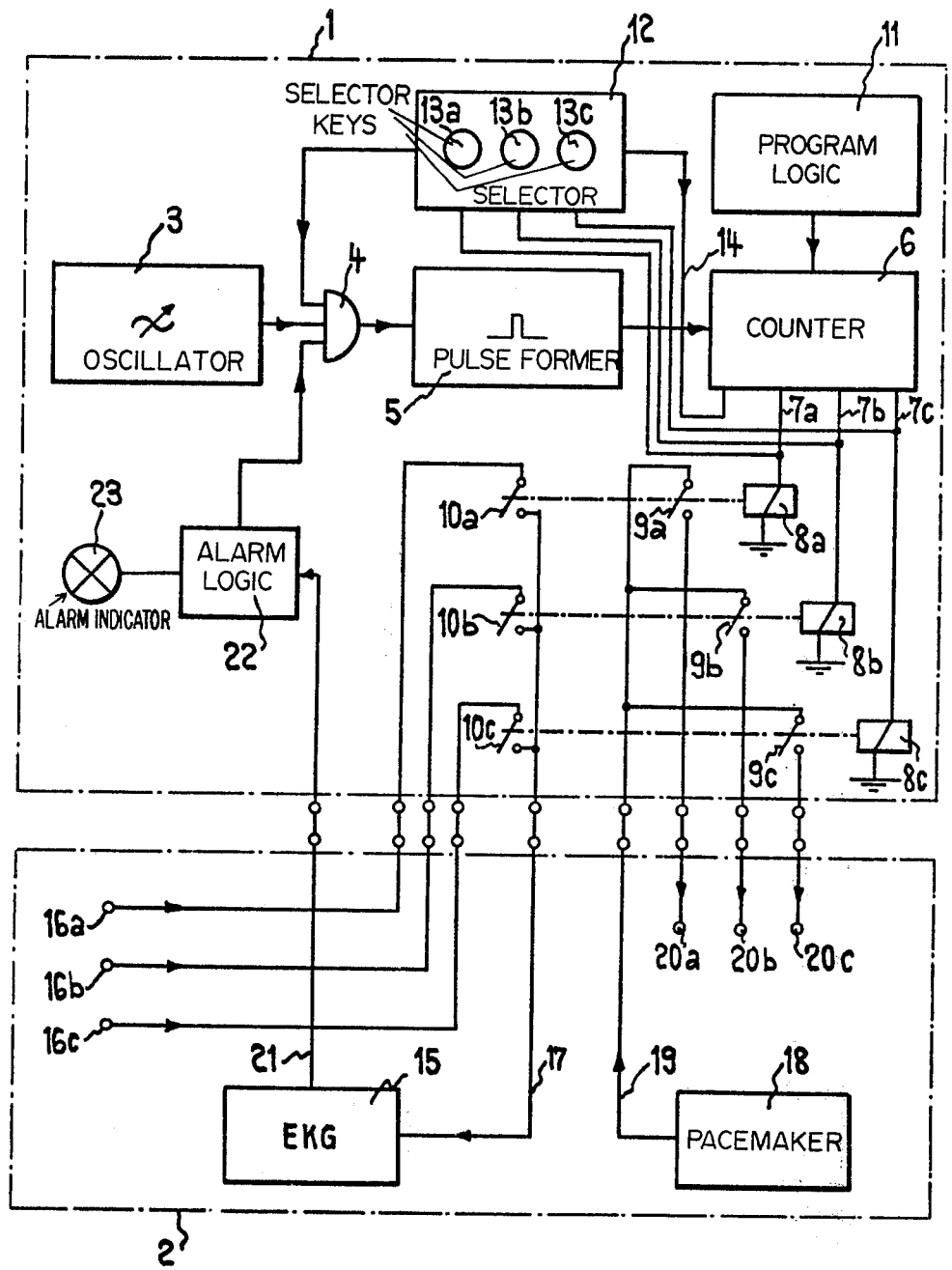

INSTALLATION FOR MONITORING SEVERAL PERSONS OR OBJECTS

This is a continuation of application Ser. No. 229,710, filed Feb. 28, 1972, and now abandoned.

BACKGROUND OF THE INVENTION

Monitoring several persons or objects, such as heart patients, requires considerable expenditure when each person is supplied with a complete monitoring installation. Identical problems may arise in monitoring machine tools, in fabrication controls inspection and similar matters. It is an object of the present invention to keep the expenditure in costly devices for monitoring several people or objects low, and yet ensure reliable monitoring.

SUMMARY OF THE INVENTION

According to the present invention there is provided an installation for sequentially monitoring several persons or objects, comprising a plurality of input channels individually associated with each person or each object, a stepping and switching circuit for successive connection of an input channel for a predetermined period to means for monitoring a person or an object, and an evaluating circuit for stopping the stepping circuit on the occurrence of a critical state. This installation permits several persons or objects to be monitored with the aid of the same circuit, such as an electrocardiograph. In addition to this costly equipment, only a timing and switching device is required to carry out successive switching to the respective persons or objects. The timing and switching device may also be used for switching an output signal to influence a person or an object; this output signal may originate from a heart pacemaker.

BRIEF DESCRIPTION OF THE DRAWING

The FIGURE is a schematic block diagram of a preferred embodiment of a monitoring installation according to the present invention.

DESCRIPTION OF THE PREFERRED EMBODIMENT

The installation shown in the drawing consists of two parts surrounded by chain-dotted lines, i.e. a timing and switching device 1 and an evaluating and influencing device 2.

The switching device 1 is provided with an oscillator 3 the output of which is connected by means of a suppression member, in the present case an AND gate 4, to the input of an impulse former 5. The frequency of the oscillator is variable within relatively wide limits. In one particular case, the time between output impulses of the impulse former may be selected to be within the region of 6 to 30 secs. The output impulses of the impulse former 5 act on a counter 6 such as a three-figure counter. This has three outputs 7a–7c each of which is normally energised in succession for the aforesaid period of 6–30 secs. Each output acts on a relay coil 8a–8c, each of which acts on two working contacts 9a–10a to 9c–10c.

The counter 6 has a program logic or program selector 11 associated therewith, which permits variation in the counting cycle. If, for example, of the three channels of the installation only two are required, then the counter may be so connected that it only switches two channels. It would also be possible to provide a program logic such that the switching device energises certain outputs more frequently than others, i.e. a particular output is energised more frequently than the others.

The installation part 1 also has a circuit 12 for manual preselection of a channel. By means of three keys 13a–13c a preselected counter output 7a, 7b or 7c respectively may be energised. During the depression of a key 13 the other counter outputs are ineffective. This is indicated in that the circuit 12 acts directly on the relays 8a–c. Another connection 14 enables the counter to be switched such that the counter is set in a position a without its output 7a being energised. At the same time the circuit 12 acts on an input of the gate 4 and suppresses this gate for as long as one of the keys 13a to 13c is actuated. Transmission of the stepping impulses through the impulse former and counter is hence interrupted and the counter remains in its position a, for as long as one of keys 13a to 13c is active.

The installation part 2 includes an electrocardiograph 15. Three ECG-inputs 16a–16c are provided, which for simplicity are shown as unipolar. These inputs are connectable via the switch 10a–10c, to a common input 17 of the ECG 15.

In the installation part 2 a heart pacemaker 18 is also provided, the output 19 of which is connected to all contacts 9a–9c. The contacts 9a–9c permit the output 19 of the pacemaker 18 to be connected to any one output terminal 20a–20c in the installation part 12. The parts 19 and 20a to 20c shown for simplicity as unipolar may be multipolar.

One output 21 of the ECG in the installion part 1 is connected to an alarm logic 22 with an alarm indicator 23. The alarm logic 22 has an output connected to the input of gate 4.

The mode of operation of the installation shown is as follows:

Three patients are connected to the inputs 16a–16c. Each patient is also connected to the respective one of the pacemaker outputs 20a–20c. Besides an optical indication and a current record or graph of the patients heart action, the electro-cardiograph 15 is so formed that at the output 21 it may indicate whether the heart functions of the momentarily monitored patient are still adequate or not. This indication may be derived from the intensity and/or pulse frequency of the ECG. Electrocardiographs having an alarm output are known e.g. under the trade names HELLIGE SERVOCARD or SIEMENS CARDALARM. Normally, i.e. when the heart activity of all patients is normal, the counter 6 is sequentially switched in a manner already described with a period of 6–30 secs. Whilst the counter is in a certain position, e.g. position a, the relay coil 8a is excited and the contacts 9a and 10a are closed. Patient A is hence connected via the input 16a and the contact 10a to the input of the ECG 15. At the same time he is connected by means of output 20a and the contact 9a to the pacemaker 18. At a physiologically maximum output towards the end of the switched-on period of the channel a the cardiograph 15 emits its finding at the output 21. If this is "normal", then the gate 4 remains open and the next stepping impulse of the oscillator switches the counter into the next position. Now channel b becomes effective and the next patient denoted by B is connected to the cardiograph 15 and the pacemaker 18. All patients A to C are monitored in this manner periodically each during 6–30 secs. In the case of a crisis of a patient the cardiograph 15 emits an alarm signal towards the end of the monitor period which simultaneously blocks gate 4 via the alarm logic 22, keeps it closed and switches on the alarm indication 23, which may be optical and/or acoustic. Since gate 4 is now blocked, stepping of the counter 6 ceases, so that the patient in danger remains connected to the apparatus. The doctor summoned by the alarm is immediately able to select this patient (suitable signalling means may be provided) make a diagnosis and give treatment, since all devices are still connected to this patient and supply essential indications required for forming a judgement. After the crisis the alarm logic is reset by actuation of a switch, whereupon the normal stepping and periodic automatic monitoring of all patients occurs.

The installation may be provided with further or different parts. Any number of channels may be provided if the permissible period of a monitoring cycle, i.e. the maximum estimated period for traversing all positions, is not exceeded. Instead of patients it is of course also possible to monitor machines, apparatus or other objects. Thus, e.g. the method of operation of identical machines of a machine group may be monitored in the manner described, so that abnormal action of any machine may be detected before much damage is done. In this case, or when series of products are examined, it is not necessary to provide a corrective action. Monitoring may lead to only an indication of "normal" or "faulty", and possibly elimination of faulty items if the inspection of products is concerned. Whilst in the example shown, where any possibility of mutual influence between individual channels must be excluded, the channels are switched by relay contacts, logical switching elements may replace the relays if there are less stringent conditions.

The division of the installation into two separate devices is favourable especially in cases where costly and/or bulky devices are already provided and need only be connected up. In such cases it is necessary to provide only an actual timing and switching device 1. In other cases where it is a question of providing the measuring devices also, the installation may be constructed as a unitary device to include both the timing and switching means and the necessary evaluation circuits, and possibly means to act on the persons or objects to be examined.

I claim:

1. An installation for combined monitoring and influencing of a plurality of objects, comprising a plurality of input channels individually associated each with an object, common measuring and indicating means for said plurality of input channels, automatic switching means for successively connecting each of said input channels to said common measuring and indicating means, means for detecting an alarm condition in anyone of said plurality of input channels and for stopping said switching means upon detection of an alarm condition, a like plurality of output channels individually associated each with a corresponding one of said objects, common treating means for overcoming said alarm condition of said objects, said switching means including contacts for successively interconnecting one of said output channels with said treating means in synchronism with the successive connection of corresponding input channels to said measuring and indicating means such that each pair of input and output channels associated with one object is repeatedly connected simultaneously to said measuring and indicating means and to said treating means.

2. An installation as recited in claim 1, including means for adjusting the period during which each input channel and corresponding output channel is operative.

3. An installation as recited in claim 1, wherein said switching means include an impulse generator the impulses of which progressively step said contacts.

4. An installation as recited in claim 3, wherein said switching means include a program selector defining a required switching sequence.

5. An installation as recited in claim 4, including a manual selector capable of overriding said program selector and closing said contacts in a predetermined input and output channel.

6. An installation as recited in claim 3, including a suppressing gate between said impulse generator and said contacts, said gate having a control input from said means for detecting an alarm condition, said gate being controlled to suppress the transmission of impulses to said contacts upon occurrence of an alarm condition.

7. An installation as recited in claim 1, including an alarm indicator connected to said means for detecting an alarm condition, said alarm indicator being actuated when an alarm condition is detected on any input.

* * * * *